United States Patent [19]

Yajima et al.

[11] 4,359,559
[45] Nov. 16, 1982

[54] NOVEL POLYMETALLOCARBOSILANE, AND PROCESS FOR ITS PRODUCTION

[75] Inventors: Seishi Yajima; Kiyohito Okamura; Yoshio Hasegawa; Takemi Yamamura, all of Oharai, Japan

[73] Assignee: UBE Industries, Ltd., Yamaguchi, Japan

[21] Appl. No.: 208,744

[22] Filed: Nov. 20, 1980

[30] Foreign Application Priority Data

Nov. 21, 1979 [JP]  Japan ................................. 54/149977
Dec. 27, 1979 [JP]  Japan ................................. 54/169443

[51] Int. Cl.³ .......................................... C08F 283/00
[52] U.S. Cl. ..................................... 525/475; 528/25; 528/35
[58] Field of Search .......................... 260/429.5, 429.3; 528/14, 17, 30, 25, 35; 526/31; 525/475; 556/431

[56] References Cited

U.S. PATENT DOCUMENTS 2,994,711  8/1961  Cohen ................................ 260/429.5
3,057,822  10/1962  Rust et al. ............................ 528/30
3,378,520  4/1968  Sattlegger et al. ............... 260/429.5
3,907,848  9/1975  Ferguson ......................... 260/429.5
4,052,430  10/1977  Yajima et al. ....................... 556/431
4,151,344  4/1979  Doss et al. ............................ 528/31
4,159,259  6/1979  Yajima et al. ....................... 528/14
4,220,600  9/1980  Yajima et al. ....................... 556/434

FOREIGN PATENT DOCUMENTS 869583  4/1971  Canada ............................... 528/17
1156192  10/1963  Fed. Rep. of Germany ........ 528/17

OTHER PUBLICATIONS

Fritz, Von G., L37 Bildung und Eigenschaften von Carbosilanen", *Angewandte Chemie*, vol. 79, No. 15, Aug. 7, 1967, pp. 657–663.

Primary Examiner—Charles F. Warren
Assistant Examiner—Raymond K. Covington
Attorney, Agent, or Firm—Ladas & Parry

[57] ABSTRACT

A polymetallocarbosilane having a number average molecular weight of 700 to 100,000 derived from a polycarbosilane having a number average molecular weight of 200 to 10,000 and containing a main-chain skeleton represented mainly by the general formula

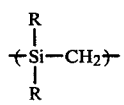

wherein R represents a hydrogen atom, a lower alkyl group or a phenyl group, and an organometallic compound represented by the general formula $MX_4$ Wherein M represents Ti or Zr, and X represents an alkoxy group having 1 to 20 carbon atoms, a phenoxy group or an acetylacetoxy group, at least one of the silicon atoms of the polymetallocarbosilane being bonded to the metal atom (M) through an oxygen atom, the ratio of the total number of the structural units $\pm Si\text{—}CH_2\pm$ to the total number of the structural units $\pm M\text{—}O\pm$ in the polymetallocarbosilane being in the range of from 2:1 to 200:1; and a process for production thereof.

6 Claims, 8 Drawing Figures

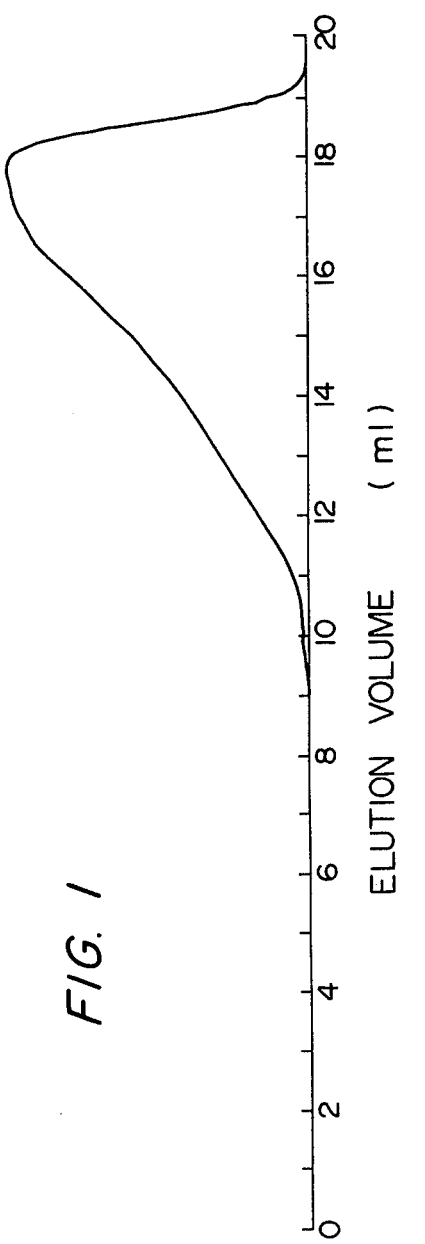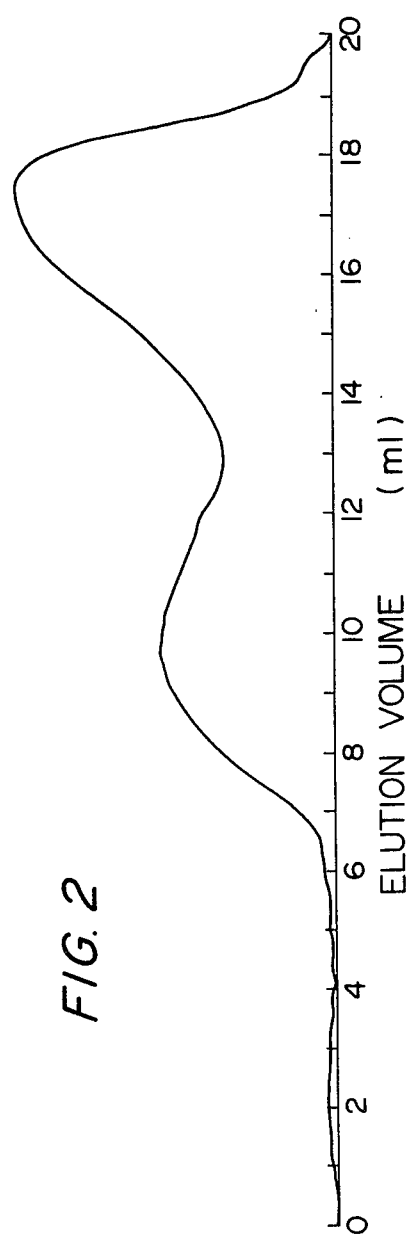

NOVEL POLYMETALLOCARBOSILANE, AND PROCESS FOR ITS PRODUCTION

BACKGROUND OF THE INVENTION

This invention relates to a novel polymetallocarbosilane derived from a polycarbosilane and an organometallic compound, and to a process for its production.

It is known that polycarbosilane, a polymer having a main-chain skeleton composed of $-(-Si-CH_2-)-$ with two side-chain groups bonded to each silicon atom, is converted to an inorganic carbide SiC on firing, and therefore, SiC fibers having good mechanical and thermal properties can be produced by molding polycarbosilane into fibers and firing the resulting fibers. The present inventors disclosed this technique in, for example, U.S. Pat. No. 4,100,233.

Later, the present inventors disclosed in U.S. patent application Ser. No. 160,516 filed June 18, 1980 a crosslinked organometallic copolymer derived from a polycarbosilane whose main-chain skeleton is composed mainly of a structural unit $-(-Si-CH_2-)-$ and a polymetallosiloxane having a metalloxane unit $-(-M-O-)-$ wherein M represents Ti or Zr and a siloxane unit $-(-Si-O-)-$, and a process for its production. They also disclosed in U.S. patent application Ser. No. 160,342 filed June 18, 1980 that composite inorganic carbide fibers having better mechanical properties than SiC fibers can be obtained by molding the aforesaid organometallic copolymer into fibers and firing the fibers.

On further investigation, the present inventors have now discovered a novel polymetallocarbosilane derived from a polycarbosilane whose main-chain skeleton is composed mainly of an $-(-Si-CH_2-)-$ structural unit and an organometallic compound having an $-(-M-O-)-$ structural unit in which M represents Ti or Zr and a process for its production. They have also found that a molded article mainly containing SiC—MC obtained by firing this polymetallocarbosilane exhibits excellent mechanical properties and oxidation resistance at high temperatures.

SUMMARY OF THE INVENTION

This invention relates to a polymetallocarbosilane having a number average molecular weight of 700 to 100,000 derived from a polycarbosilane having a number average molecular weight of 200 to 10,000 and containing a main-chain skeleton represented by the general formula $$-(-\underset{\underset{R}{|}}{\overset{\overset{R}{|}}{Si}}-CH_2-)- \tag{I}$$

wherein R represents a hydrogen atom, a lower alkyl group or a phenyl group,
and an organometallic compound represented by the general formula $$MX_4 \tag{II}$$

wherein M represents Ti or Zr, and X represents an alkoxy group having 1 to 20 carbon atoms, a phenoxy group, or an acetylacetoxy group,
at least one of the silicon atoms of the polymetallocarbosilane being bonded to the metal atom (M) through an oxygen atom, the ratio of the total number of the structural units $-(-Si-CH_2-)-$ to the total number of the structural units $-(-M-O-)-$ in the polymetallocarbosilane being in the range of from 2:1 to 200:1.

According to the present invention, there is also provided a process for producing a novel polymetallocarbosilane having a number average molecular weight of about 700 to about 100,000, which comprises mixing the polycarbosilane of general formula (I) with the organometallic compound of general formula (II) in such proportions that the ratio of the total number of the structural units $-(-Si-CH_2-)-$ to that of the structural units $-(-M-O-)-$ is in the range of from 2:1 to 200:1, and heating the mixture in an atmosphere inert to the reaction thereby to bond at least one of the silicon atoms of the polycarbosilane to the metallic atom (M) through an oxygen atom.

BRIEF DESCRIPTION OF THE DRAWINGS

FIG. 1 is a gel permeation chromatogram of the polycarbosilane obtained in Referential Example 1;

FIG. 2 is a gel permeation chromatogram of the polytitanosilane obtained in Referential Example 2;

DETAILED DESCRIPTION OF THE INVENTION

The polymetallocarbosilane of this invention, according to the functionality of the metallic atom M (which is titanium or zirconium), includes a monofunctional polymer, difunctional polymer, trifunctional polymer an tetrafunctional polymer as shown below.

(Monofunctional polymer)   (Difunctional polymer)

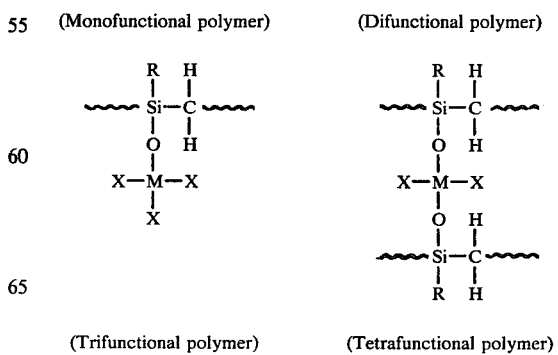

(Trifunctional polymer)   (Tetrafunctional polymer)

-continued

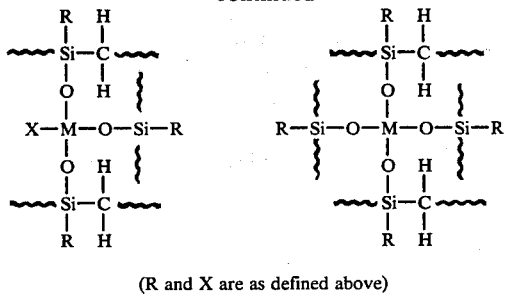

(R and X are as defined above)

In the monofunctional polymer, the organometallic compound is bonded as a pendant side-chain to the polymer chain of the polycarbosilane. In the difunctional, trifunctional and tetrafunctional polymers, two or more polycarbosilanes are crosslinked by an $+M-O+$ linkage.

The polycarbosilane itself and the organometallic compound itself are known, but a polymer composed of the polycarbosilane and the organometallic compound has not been known to date.

Gel permeation chromatography (GPC) and infrared absorption spectrum (IR) lead to the determination that the novel polymetallocarbosilane of this invention has a structure different from the polycarbosilane.

This will be explained below with reference to the accompanying drawings, taking up as an example one embodiment of this invention in which the metal atom M is titanium (i.e. polytitanocarbosilane).

FIG. 1 is a gel permeation chromatogram of the polycarbosilane produced by the method of Example 1 given hereinbelow, and FIG. 2 is a gel permeation chromatogram of the novel polytitanocarbosilane produced by reacting the polycarbosilane with a titanium alkoxide in a weight ratio of 10:7 (in both cases, a solution of 0.006 mg of the polymer in 5 ml of tetrahydrofuran was used as a measuring sample). In FIG. 2, a new peak not seen in FIG. 1 appears at an elution volume of about 10 ml on the abscissa. This means that the novel polytitanocarbosilane obtained by the process of this invention is not a mere mixture of polycarbosilane and the titanium alkoxide, but is an organometallic polymer of a higher molecular weight than the polycarbosilane as a result of bonding of the two by the reaction. [In the gel permeation chromatogram, the lower the figure of a peak on the abscissa (elution volume), the higher the corresponding molecular weight.]

Figure 3:
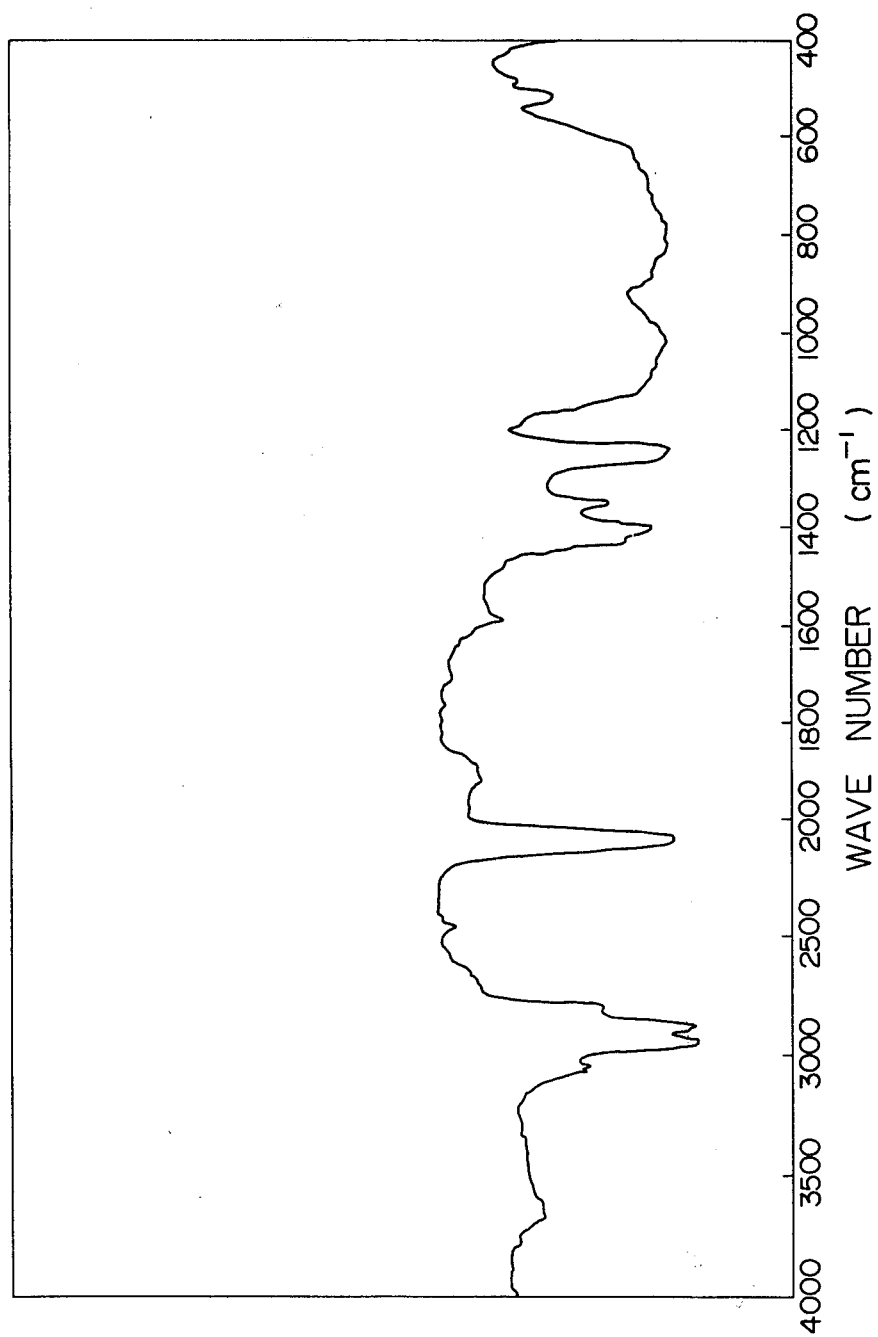
FIG. 3 is an infrared absorption spectrum of the polycarbosilane obtained in Referantial Example 1.
Figure 4:
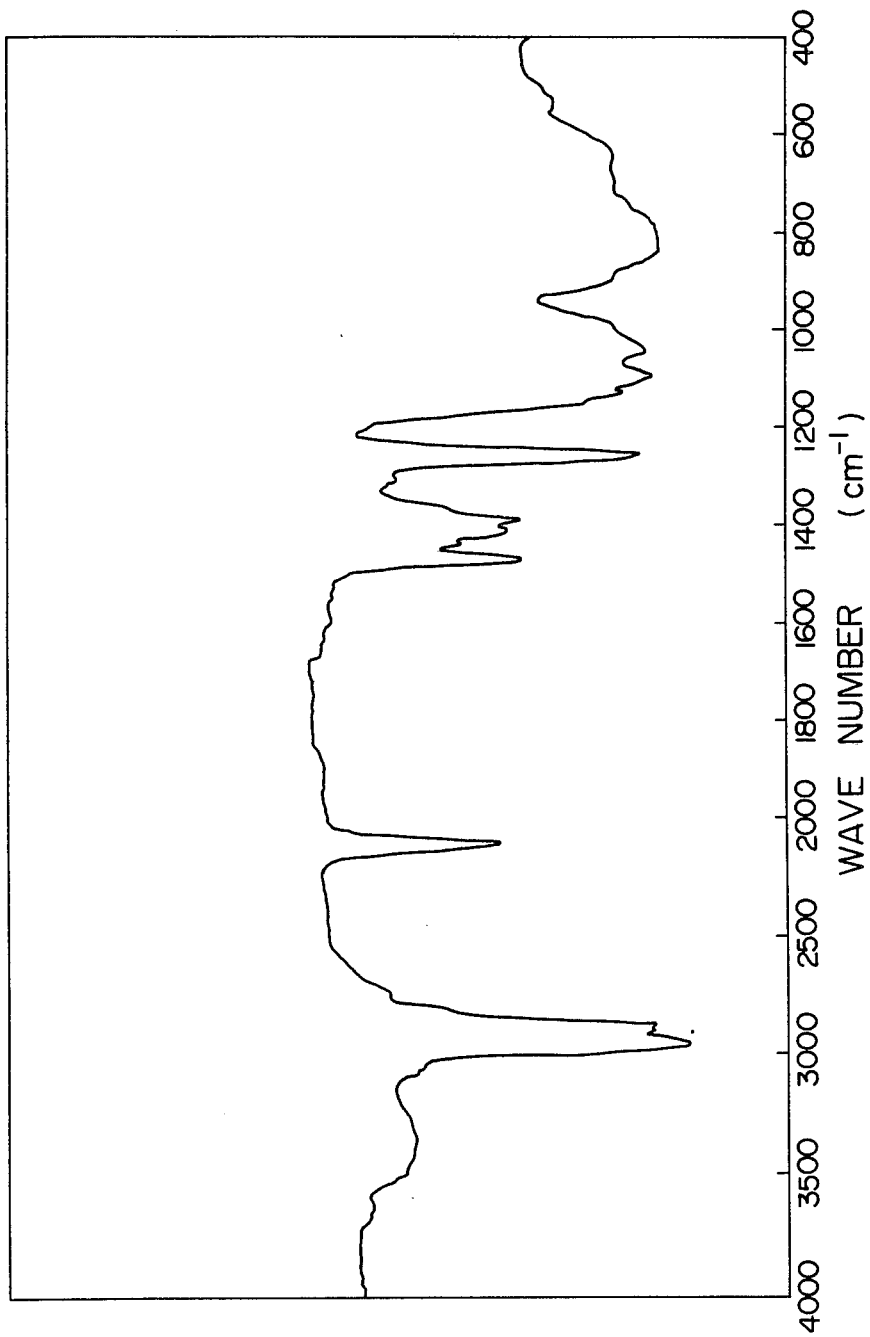
FIG. 4 is an infrared absorption spectrum of the polytitanocarbosilane of Example 1.

FIG. 3 is an infrared absorption spectrum of the polycarbosilane obtained by the method of Referential Example 1, and FIG. 4 is an infrared absorption spectrum of the novel polytitanocarbosilane of this invention obtained by reacting the polycarbosilane with a titanium alkoxide in a weight ratio of 10:7. The absorptions at 1250 cm$^{-1}$ and 2100 cm$^{-7}$ correspond to Si—CH$_3$ and Si—H present in the starting polycarbosilane. In the infrared absorption spectrum shown in FIG. 4, too, the two absorptions exist. But when FIG. 3 is compared with FIG. 4 with respect to the ratio of the intensity of an absorption at 2100 cm$^{-1}$ ascribable to Si—H to that of an absorption at 1250 cm$^{-1}$ ascribable to Si—CH$_3$, it is 1.03 in FIG. 3, but decreases to 0.349 in FIG. 4. This shows that as a result of the reaction of the polycarbosilane with the titanium alkoxide, the Si—H linkages in the polycarbosilane partly disappear whereby the polycarbosilane reacts with the titanium alkoxide; and that the polycarbosilane is crosslinked by the titanium alkoxide.

In other words, the novel polytitanocarbosilane of this invention produced in Example 1 forms as a result of partial elimination of hydrogen atoms bonded as a side chain group to the silicon atom of the structural units $+Si-CH_2+$ present in the main-chain skeleton of the polycarbosilane and the bonding of the silicon atom to the titanium atoms of the bond units $+Ti-O+$ of the titanium alkoxide.

Figure 6:
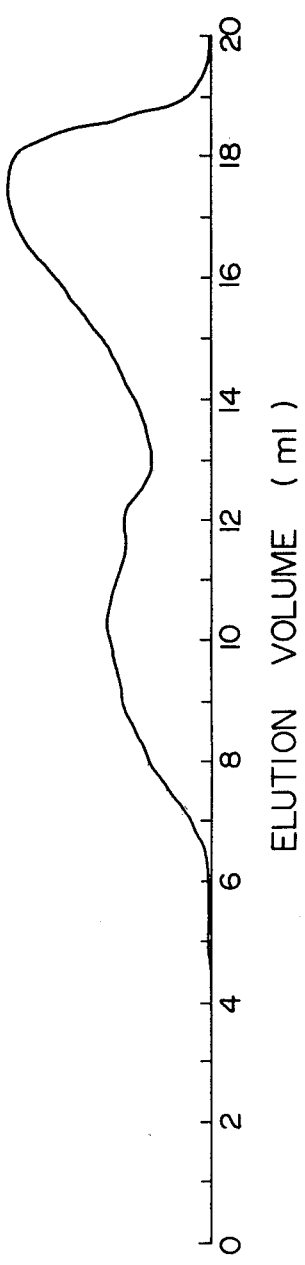
FIG. 6 is a gel permeation chromatogram of the polyzirconocarbosilane of Example 5.
Figure 7:
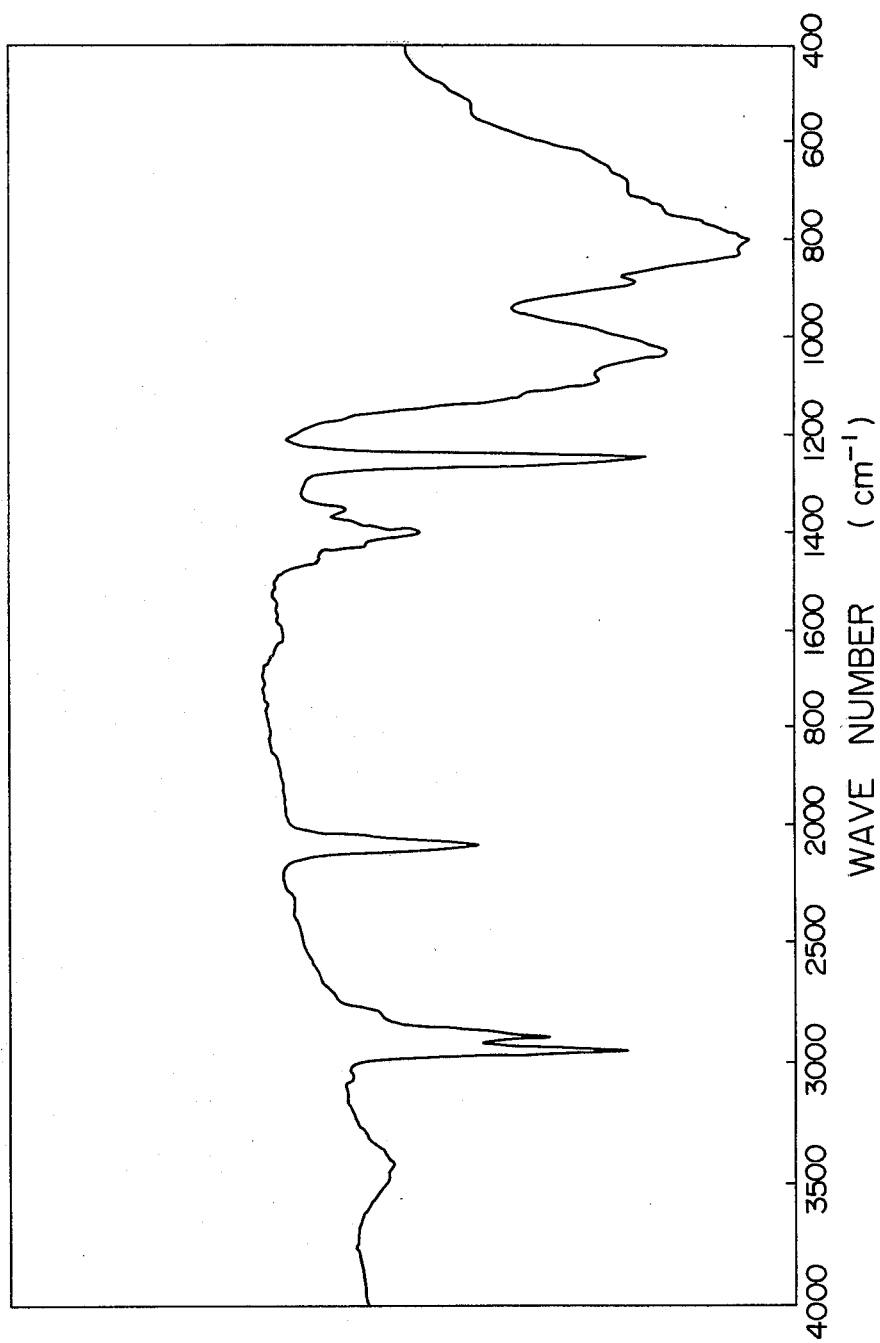
FIG. 7 is an infrared absorption spectrum of the polyzirconocarbosilane of Example 5.

Likewise, a comparative study of the two gel permeation chromatograms shown in FIGS. 1 and 6 and a comparative study of the two infrared absorption spectra shown in FIGS. 3 and 7 demonstrate that in the polymetallocarbosilane in another embodiment of this invention in which the metal atom M is zirconium (e.g., polyzirconocarbosilane), some of the silicon atoms in the structural units $+Si-CH_2+$ present in the main-chain skeleton of the polycarbosilane are bonded to the zirconium atoms of the bond units $+Zr-O+$ through an oxygen atom.

The process of this invention for producing the novel polymetallocarbosilane of this invention comprises heating a mixture of the polycarbosilane of general formula (I) and the organometallic compound of general formula (II) in the absence of a solvent or in an organic solvent in an atmosphere inert to the reaction to bond at least one of the silicon atoms of the polycarbosilane to the metal atom (M) through an oxygen atom. The reaction may be performed in the absence of a solvent by melting the polycarbosilane. Usually, it is advantageous to use an organic solvent because the reaction proceeds smoothly and formation of a by-product such as a gel-like product can be inhibited. Examples of preferred solvents are n-hexane, benzene, toluene, xylene and tetrahydrofuran. It is essential that the reaction be carried out in an atmosphere inert to the reaction, such as an atmosphere of nitrogen, argon or hydrogen. If the reaction is carried out in an oxidizing atmosphere such as air, the starting polycarbosilane and organometallic compound undergo oxidation.

The reaction temperature may be varied over a broad range. For example, when an organic solvent is used, the reaction mixture may be heated to a temperature above the boiling point of the organic solvent. When it is desired to obtain a polymer having a high number average molecular weight, it is preferred that the reaction mixture be continuously heated to above the boiling point of the organic solvent, and the reaction be performed while distilling off the organic solvent. Generally, the reaction temperature is preferably not more than 500° C., especially preferably 100° to 350° C. The reaction time is not particularly important, and usually about 1 to 10 hours. Generally, the reaction is carried out preferably at atmospheric pressure or pressures near it. If the reaction is carried out in vacuum or under a high degree of reduced pressure, low-molecular-weight components distill off out of the reaction system so that the yield of the product decreases. Preferably, the process of this invention is carried out while feeding an inert gas as a current to the reaction system. This makes it possible to maintain the pressure of the inside of the reactor almost at atmospheric pressure, and a rise in temperature and a rise in pressure which is due to hydrocarbons gases released during the reaction such as methane can be prevented.

The polycarbosilane used as one starting material for the production of the novel polymetallocarbosilane in the process of this invention has a main-chain skeleton represented mainly by the general formula

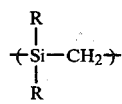

wherein R represents a hydrogen atom, a lower alkyl group or a phenyl group,
having a number average molecular weight of 200 to 10,000. In addition to the aforesaid side chains, a hydroxyl group may be bonded to the silicon atom at the terminal groups of the polycarbosilane.

The method for producing the polycarbosilane is known, and the polycarbosilane used as a starting material in this invention can be produced by such a known method. For example, Fritz disclosed a method for producing polycarbosilane by directly polymerizing monosilane [Angew. Chem., 79, p. 657 (1967)]. U.S. Pat. No. 4,052,430 granted to the present applicants discloses a method for producing polycarbosilane by converting monosilane to polysilane and polymerizing it. Of the polycarbosilanes used in this invention, polycarbosilane whose main-chain skeleton consists substantially of $+Si-CH_2+$ structural units can be produced by the above known methods.

Polycarbosilane especially suitable for use as a starting material in this invention is modified polycarbosilane produced by the method described in U.S. Pat. No. 4,220,600 granted to the present applicants, that is, polycarbosilane partly containing a siloxane linkage. This modified polycarbosilane consists mainly of the following structural units (A) and (B),

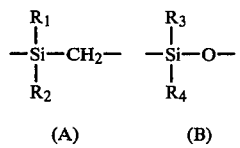

wherein $R_1$, $R_2$, $R_3$ and $R_4$, independently from each other, represent a hydrogen atom, a lower alkyl group or a phenyl group,
the ratio of (A) to (B) being from 5:1 to 200:1, has a number average molecular weight of 500 to 10,000, and partly contains a siloxane linkage. This modified polycarbosilane can be produced by adding 0.01 to 15% by weight of polyborosiloxane whose skeletal components consist of B, Si and O with at least a part of the Si sidechains having a phenyl group to polysilane having the structure

wherein $n \geqq 3$, and $R_1$ and $R_2$ have the same meanings as above,
and heating the polymer mixture at a temperature of usually at least 250° C., preferably 300° to 500° C., for a period of usually 8 to 10 hours in an atmosphere inert to the reaction.

The organometallic compound used as another starting material for the production of the novel polymetallocarbosilane by the process of this invention is represented by the general formula

$$MX_4$$

wherein X represents an alkoxy group having 1 to 20 carbon atoms, a phenoxy group or an acetylacetoxy group,
and may be produced by synthesizing methods usually practised for obtaining such a compound.

In the process of this invention, the polycarbosilane and the organometallic compound are mixed in such proportions that the ratio of the total number of the structural units —Si—CH$_2$— of the polycarbosilane to that of the structural units —M—O— of the organometallic compound is within the range of from 2:1 to 200:1, and then the mixture is heated to produce a polymer. As a result of this reaction, one side-chain group R bonded to the silicon atom is split off at a part of the structural unit

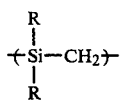

in the main-chain skeleton of polycarbosilane, and the silicon atom is bonded to the metal atom (M) of the organometallic compound through an oxygen atom.

The novel polymetallocarbosilane produced by the process of this invention is a polymer having a number average molecular weight of about 700 to 100,000 which is a thermoplastic material melting usually at 50° to 400° C. and being soluble in such solvents as n-hexane, benzene, toluene, xylene and tetrahydrofuran.

By firing the novel polymetallocarbosilane of this invention in vacuum, an inert gaseous atmosphere or a non-oxidizing gaseous atmosphere, it can be converted to a molded article consisting mainly of SiC and MC (M=Ti or Zr) and having higher mechanical strength and better oxidation resistance at high temperatures than conventional SiC molded articles.

Examples of such a molded article are continuous filaments, films, coated films and powders. The novel polymetallocarbosilane of this invention may also be used as a binder for sintering or an impregnant.

The following examples illustrate the present invention.

REFERENTIAL EXAMPLE 1

Anhydrous xylene (2.5 liters) and 400 g of sodium were put into a 5-liter three-necked flask, and heated to the boiling point of xylene in a stream of nitrogen gas. One liter of dimethyldichlorosilane was added dropwise over 1 hour. After the addition, the mixture was heated under-reflux for 10 hours to form a precipitate. The precipitate was filtered, and washed with methanol and then with water to afford 420 g of polydimethylsilane as a white powder.

Separately, 759 g of diphenyldichlorosilane and 124 g of boric acid were heated at a temperature of 100° to 120° C. in n-butyl ether in an atmosphere of nitrogen gas. The resulting white resinous product was further heated at 400° C. in vacuum for 1 hour to give 530 g of polyborodiphenylsiloxane.

Then, 250 g of the polydimethylsilane obtained above was added to 8.27 g of the polyborodiphenylsiloxane obtained above. The mixture was heated to 350° C. in a stream of nitrogen in a 2-liter quartz tube equipped with a refluxing tube, and polymerized for 6 hours to afford polycarbosilane as one starting material in this invention. The product was allowed to cool at room temperature, and xylene was added. The product was taken out as a solution in xylene. The xylene was evaporated, and the residue was concentrated at 320° C. for 1 hour in a stream of nitrogen to afford 140 g of a solid. The resulting polymer had a number average molecular weight, measured by a vapor pressure osmotic pressure method (VPO method), of 995. The IR spectrum of this substance was measured. As shown in FIG. 3, it showed an absorption of Si—CH$_3$ in the vicinity of 800 cm$^{-1}$ and at 1250 cm$^{-1}$, an absorption of C—H at 1400, 2900 and 2950 cm$^{-1}$, an absorption of Si—H at 2100 cm$^{-1}$ and an absorption of Si—CH$_2$—Si in the vicinity of 1020 cm$^{-1}$ and at 1355 cm$^{-1}$. The polymer obtained was polycarbosilane including the constituent elements

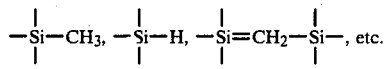

REFERENTIAL EXAMPLE 2

One hundred grams of tetramethylsilane was weighed, and reacted at 770° C. for 24 hours in an atmosphere of nitrogen using a flowing-type device capable of permitting recycling to obtain polycarbosilane as one starting material of this invention. The product was allowed to cool at room temperature, and n-hexane was added. It was taken out as a solution in n-hexane. The solution was filtered to remove the insoluble material, and then n-hexane was evaporated. The residue was concentrated at 180° C. for 1 hour under a reduced pressure of 5 mmHg to afford 14 g of a tacky substance. This polymer had a number average molecular weight, measured by the VPO method, of 450. The IR spectrum of this substance showed the various absorption peaks based on polycarbosilane as in Referential Example 1.

REFERENTIAL EXAMPLE 3

The polydimethylsilane (250 g) obtained in Referential Example 1 was put into an autoclave, and heat-polymerized in an argon atmosphere at 470° C. and about 100 atmospheres for 14 hours to obtain polycarbosilane as one starting material in this invention. The product was allowed to cool at room temperature, and n-hexane was added. The product was thus taken out as a solution in n-hexane. The n-hexane was evaporated, and the residue was concentrated at 280° C. and 1 mmHg for 1 hour. The resulting solid was treated with acetone to remove low-molecular-weight materials and obtain 60 g of a polymer having a number average molecular weight of 8,750. The IR spectrum of this substance showed the various peaks based on the polycarbosilane same as in Referential Example 1.

EXAMPLE 1

Forty grams of the polycarbosilane obtained in Referential Example 1 and 28 g of titanium tetrabutoxide were weighed, and 400 ml of xylene was added to the mixture of form a homogeneous mixed solution. The solution was subjected to refluxing reaction at 130° C. for 1 hour with stirring in an atmosphere of nitrogen gas. After the refluxing reaction, the temperature was raised further to 200° C., to distill off the xylene solvent. The residue was polymerized at 200° C. for 1 hour to afford an organometallic polymer containing titanium metal (polytitanocarbosilane). The polymer had a number average molecular weight, measured by the VPO method, of 1,528. As is seen from a comparison of the results of gel permeation chromatography of this substance shown in FIG. 2 with those of gel permeation of polycarbosilane in Referential Example 1 shown in FIG. 1 (the gel permeation chromatogram of a substance obtained by treating the polycarbosilane of Referential Example 1 under the same conditions as above in the absence of titanium tetrabutoxide is the same as FIG. 1), the polymer obtained in this Example is not a mere mixture of the polycarbosilane and titanium tetrabutoxide, but a polymer of an increased molecular weight resulting from the reaction of the two substances. Furthermore, it is seen from a comparison of the IR spectrum of this substance shown in FIG. 4 with that of polycarbosilane shown in FIG. 3 that in the polymer obtained in this Example, a part of the Si—H linkage in the polycarbosilane disappeared, and the silicon atom at this portion was bonded to the titanium atom of titanium tetrabutoxide through an oxygen atom, whereby partly, the side chain of the polycarbosilane had the group —O—Ti(OC$_4$H$_9$)$_3$ and partly the polycarbosilane was crosslinked through a $+$Ti—O$+$ linkage. The reaction conversion and/or the ratio of crosslinkage at the Si—H linkage portion of the polymer was calculated on the basis of the above IR data, and found to be 46.7%. The ratio of the total number of the $+$Si—CH$_2$$+$ linkages of the polycarbosilane portion of this polymer to the total number of —O—Ti(OC$_4$H$_9$)$_3$ and $+$Ti—O$+$ linkages was about 8:1.

Figure 5:
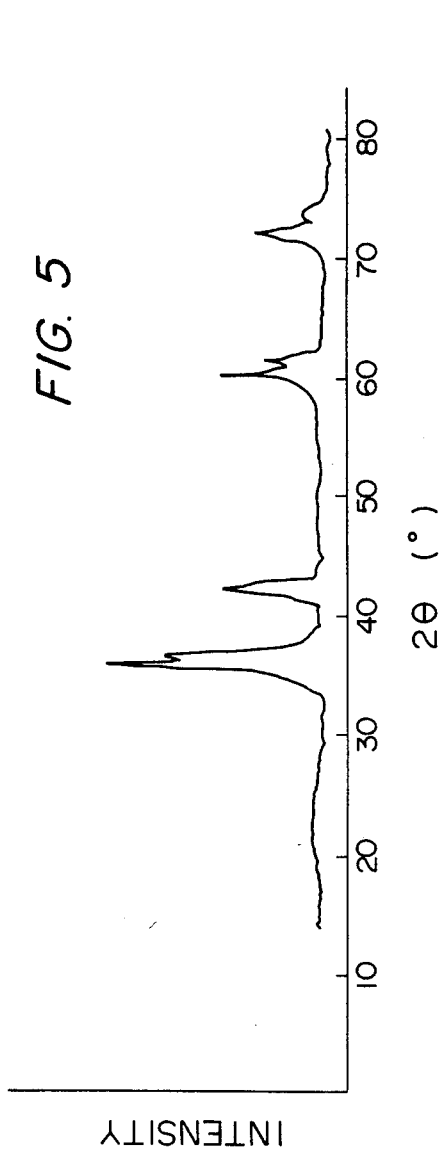
FIG. 5 is an X-ray powder diffraction pattern of the composite carbide obtained by firing the polytitanocarbosilane of Example 1 in a nitrogen atmosphere at 1700° C.

The polymer obtained in this Example was heated in an atmosphere of nitrogen at 1700° C. over 8.5 hours, and fired at 1700° C. for 1 hour to afford a black solid. The X-ray powder diffraction pattern of this substance was determined. As shown in FIG. 5, the X-ray powder diffraction pattern of this substance showed a diffraction line (111) of β-SiC at 2θ=35.8°, a diffraction line (220) of β-SiC at 2θ=60.1°, a diffraction line (311) of β-SiC at 2θ=72.1°, a diffraction line (200) of TiC at 2θ=42.4°, a diffraction line (111) of TiC at 2θ=36.4°, a diffraction line (220) of TiC at 2θ=61.4°, and a diffraction line (113) of TiC at 2θ=73.5°.

From the fact that the diffraction lines of TiC in the above diffraction pattern were shifted to a higher angle side than those of conventional TiC and the lattice constant of TiC differed from that of conventional TiC, it is presumed that the resulting product was a composite carbide composed mainly of β-SiC, TiC, a solid solution of β-SiC and TiC, and TiC$_{1-x}$ (wherein 0<x<1).

EXAMPLE 2

Polycarbosilane (40.0 g) having a number average molecular weight of 2,990 which was obtained by concentrating the polymer obtained in Referential Example 1 at 330° C. for 3 hours in a stream of nitrogen and 65.3 g of titanium tetraisopropoxide were weighed, and 500 ml of benzene was added to the mixture to form a homogeneous mixed solution. The solution was subjected to refluxing reaction at 70° C. for 5 hours with stirring in an argon gas atmosphere. After the refluxing reaction, the reaction mixture was further heated to distill off benzene. The residue was polymerized at 150° C. for 2 hours to afford polytitanocarbosilane having a number average molecular weight of 8,900. The resulting polymer was a uniform blackish blue resinous material. In the resinous material, the ratio of the total number of the ${+}$Si—CH$_2{+}$ linkages of the polycarbosilane portion to the total number of —O—Ti(O—isoC$_3$H$_7$)$_3$ and ${+}$Ti—O${+}$ linkages was about 3:1. The reaction conversion and/or the ratio of crosslinkage at the Si—H linkage portion of this polymer was calculated on the basis of the IR data of this substance, and found to be 85%.

EXAMPLE 3

Forty grams of the polycarbosilane obtained in Referential Example 2 and 10 g of titanium tetrabutoxide were weighed, and 300 ml of n-hexane was added to the mixture to form a homogeneous mixed solution. The solution was subjected to refluxing reaction at 60° C. for 8 hours in an atmosphere of nitrogen gas with stirring. After the refluxing reaction, the reaction mixture was further heated to distill off the n-hexane, and then polymerized at 170° C. for 3 hours to afford polytitanocarbosilane having a number average molecular weight of 1,450. In the resulting polymer, the ratio of the total number of the ${+}$Si—CH$_2{+}$ linkages of the polycarbosilane portion and the total number of the —O—Ti(OC$_4$H$_9$)$_3$ and ${+}$Ti—O${+}$ linkages was about 23:1. The reaction conversion and/or the ratio of crosslinkage at the Si—H linkage portion of this polymer was calculated on the basis of the IR data of this substance, and found to be nearly 100%.

EXAMPLE 4

The polycarbosilane obtained in Referential Example 3 (40.0 g) and 1.6 g of titanium tetraisopropoxide were weighed, and 200 ml of xylene was added to the mixture to form a homogeneous mixed solution. The solution was subjected to refluxing reaction at 130° C. for 2 hours in an argon gas atmosphere with stirring. After the refluxing reaction, the reaction mixture was further heated to distill off xylene, and polymerized at 300° C. for 30 minutes to afford polytitanosilane having a number average molecular weight of 18,500. In the resulting polymer, the ratio of the total number of the ${+}$Si—CH$_2{+}$ linkages of the polycarbosilane portion to the total number of the —O—Ti(O—isoC$_3$H$_7$)$_3$ and ${+}$Ti—O${+}$ linkages was about 12:1. The reaction conversion and/or the ratio of crosslinkage at the Si—H linkage portion of this polymer was calculated on the basis of the IR data of this substance, and found to be about 5%.

EXAMPLE 5

The polycarbosilane obtained in Referential Example 1 (40.0 g) and 31.5 g of zirconium tetrabutoxide were weighed, and 400 ml of xylene was added to the mixture to form a homogeneous mixed solution. The solution was subjected to refluxing reaction at 130° C. for 1 hour with stirring in an atmosphere of nitrogen gas. After the refluxing reaction, the temperature was raised further to 230° C. to distill off the xylene solvent. The residue was polymerized at 230° C. for 1 hour to afford an organometallic polymer containing zirconium metal (polyzirconocarbosilane). The polymer had a number average molecular weight, measured by the VPO method, of 1,677. As is seen from a comparison of the results of the gel permeation chromatography of this substance shown in FIG. 6 with the results of gel permeation chromatography of the polycarbosilane of Referential Example 1 shown in FIG. 1, it is seen that the polymer obtained in Example 5 is not a mere mixture of the polycarbosilane and zirconium tetrabutoxide, but a polymer of an increased molecular weight resulting from the reaction of the two substances. Furthermore, a comparison of the IR spectrum of this substance shown in FIG. 7 with that of the polycarbosilane of Referential Example 1 shown in FIG. 3 demonstrates that in the resulting organometallic polymer, the Si—H linkage in the polycarbosilane partly disappeared, and the silicon atom at this part was bonded to the zirconium atom of the zirconium tetrabutoxide through an oxygen atom, whereby partly the side-chain of the polycarbosilane had the group —O—Zr(OC$_4$H$_9$)$_3$ and partly the polycarbosilane was crosslinked through the ${+}$Zr—O${+}$ linkage. The reaction conversion and/or the ratio of crosslinkage at the Si—H linkage portion of the polymer was calculated on the basis of the above IR data, and found to be 49.7%. The ratio of the total number of the ${+}$Si—CH$_2{+}$ linkages of the polycarbosilane portion to the total number of the —O—Zr(OC$_4$H$_9$)$_3$ and ${+}$Zr—O${+}$ linkages was about 8:1.

Figure 8:
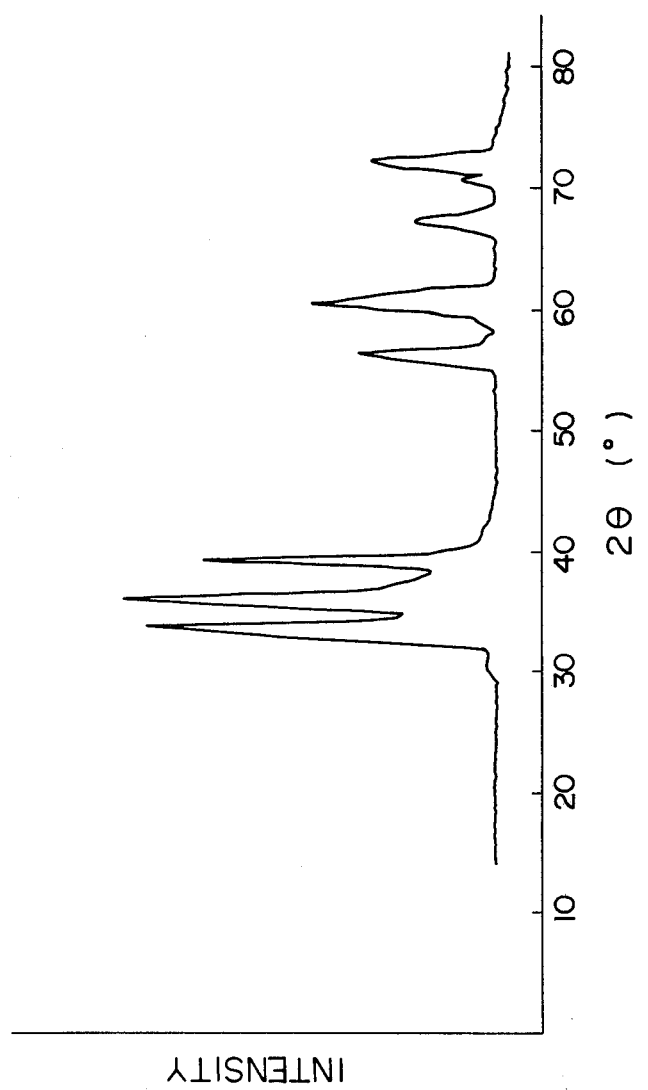
FIG. 8 is an X-ray powder diffraction pattern of the composite carbide obtained by firing the polyzirconocarbosilane of Example 5 in a nitrogen atmosphere at 1700° C.

The polymer obtained in this Example was heated to 1700° C. over 8.5 hours in an atmosphere of nitrogen, and then fired at 1700° C. for 1 hour to afford a black solid. The X-ray powder diffraction pattern of this substance was determined. As shown in FIG. 8, the X-ray powder diffraction pattern of this substance showed a diffraction line (111) of β-SiC at 2θ=35.8°, a diffraction line (220) of β-SiC at 2θ=60.1°, a diffraction line (311) of β-SiC at 2θ=72.1°, a diffraction line (111) of ZrC at 2θ=33.7°, a diffraction line (200) of ZrC at 2θ=39.1°, a diffraction line (220) of ZrC at 2θ=56.3°, a diffraction line (311) of ZrC at 2θ=67.0° and a diffraction line (222) of ZrC at 2θ=70.6°. From the fact that the diffraction lines of ZrC were shifted to a higher angle side than those of conventional ZrC and its lattice constant differed from conventional ZrC, it is presumed that the resulting substance was a composite carbide composed mainly of β-SiC, ZrC, a solid solution of β-SiC and ZrC, and ZrC$_{1-x}$ (0<x<1).

EXAMPLE 6

Polycarbosilane (40.0 g) having a number average molecular weight obtained by concentrating the polymer obtained in Example 1 at 330° C. for 3 hours in a stream of nitrogen and 75.3 g of zirconium tetraisopropoxide were weighed, and 500 ml of benzene was added to the mixture to form a homogeneous mixed solution. The solution was subjected to refluxing reaction at 70° C. for 5 hours in an atmosphere of argon gas with stirring. After the refluxing reaction, the reaction mixture was further heated to distill off benzene, and then polymerized at 150° C. for 2 hours to afford polyzirconocarbosilane having a number average molecular weight of 9,760. The ratio of the total number of the ${+}$Si—CH$_2{+}$ linkages of the polycarbosilane portion of this polymer to that of the —O—Zr(O—isoC$_3$H$_7$)$_3$ and ${+}$Zr—O${+}$ linkages was about 3:1. The reaction conversion and/or the ratio of crosslinkage, in the Si—H linkage portion of this polymer was calculated on the basis of the IR data of this substance, and found to be 87%.

EXAMPLE 7

The polycarbosilane (40.0 g) obtained in Referential Example 2 and 14.3 g of tetrakis-acetylacetonatozirconium were weighed, and 60 ml of ethanol and 300 ml of xylene were added to the mixture to form a homogeneous mixed solution. The solution was subjected to refluxing reaction at 60° C. for 8 hours in an atmosphere of nitrogen gas. After the refluxing reaction, the reaction mixture was further heated to distill off the ethanol and xylene, and then polymerized at 180° C. for 3 hours to afford polyzirconocarbosilane having a number average molecular weight of 1,380. The ratio of the total number of the $+Si-CH_2+$-linkages of the polycarbosilane portion of this polymer to the total number of the $-O-Zr(CH_3COOCHCOOH_3)_3$ and $+Zr-O+$ linkages was about 23:1. The reaction conversion and/or the ratio of crosslinkage at the Si—H linkage portion of this polymer was calculated on the basis of the IR data of this substance, and found to be nearly 100%.

EXAMPLE 8

The polycarbosilane obtained in Referential Example 3 (40.0 g) and 2.6 g of zirconium tetraphenoxide were weighed, and 200 ml of xylene was added to the mixture to form a homogeneous mixed solution. The solution was subjected to refluxing reaction at 130° C. for 2 hours in an atmosphere of argon gas with stirring. After the refluxing reaction, the reaction mixture was further heated to distill off the xylene, and polymerized at 300° C. for 30 minutes to afford polyzirconocarbosilane having a number average molecular weight of 19,300. The ratio of the total number of the $+Si-CH_2+$ linkages of the polycarbosilane portion of this polymer to that of the $-O-Zr(OC_6H_5)_3$ and $+Zr-O+$ linkages was about 122:1. The reaction conversion and/or the ratio of crosslinkage at the Si—H linkage portion of this polymer was calculated on the basis of the IR data of thhs substance, and found to be about 7%.

What we claim is:

1. A polymetallocarbosilane having a number average molecular weight of 700 to 100,000 derived from a polycarbosilane having a number of average molecular weight of 200 to 10,000 and containing a main-chain skeleton represented mainly by the general formula

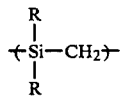

wherein R represents a hydrogen atom, a lower alkyl group or a phenyl group,
and an organometallic compound represented by the general formula

MX$_4$ wherein M represents Ti or Zr, and X represents an alkoxy group having 1 to 20 carbon atoms, a phenoxy group or an acetylacetoxy group,
at least one of the silicon atoms of the polymetallocarbosilane being bonded to the metal atom (M) through an oxygen atom, the ratio of the total number of the structural units $+Si-CH_2+$ to the total number of the structural units $+M-O+$ in the polymetallocarbosilane being in the range of from 2:1 to 200:1.

2. The polymetallocarbosilane of claim 1 which is a thermoplastic material melting at 50° to 400° C.

3. The polymetallocarbosilane of claim 1 which is soluble in organic solvents.

4. A process for producing a novel polymetallocarbosilane having a number average molecular weight of about 700 to 100,000, which comprises mixing a polycarbosilane having a number average molecular weight of 200 to 10,000 and containing a main-chain skeleton represented by the general formula

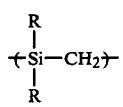

wherein R represents a hydrogen atom, a lower alkyl group or a phenyl group,
with an organometallic compound represented by the general formula

MX$_4$ wherein M represents Ti or Zr and X represents an alkoxy group having 1 to 20 carbon atoms, a phenoxy group or an acetylacetoxy group,
in such proportions that the ratio of the total number of the structural units $+Si-CH_2+$ of the polycarbosilane to the total number of the structural units $+M-O+$ of the organometallic compound is within the range of from 2:1 to 200:1; and heating the resulting mixture in an atmosphere inert to the reaction, thereby to bond at least one of the silicon atoms of the polycarbosilane to the metallic atom (M) of the organometallic compound through an oxygen atom.

5. The process of claim 4 wherein the heating is carried out at a temperature of not more than 500° C.

6. The polymetallocarbosilane of claim 1 wherein the main skeleton of the polycarbosilane is represented mainly by the following general formulas (A) and (B):

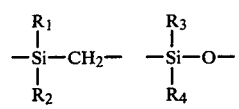

wherein R$_1$, R$_2$, R$_3$ and R$_4$, independently from each other, represent a hydrogen atom, a lower alkyl group or a phenyl group, the ratio of (A) to (B) being from 5:1 to 200:1 and has a number average molecular weight of 500 to 10,000.

* * * * *